(12) United States Patent
Tarafder et al.

(10) Patent No.: US 11,604,174 B2
(45) Date of Patent: Mar. 14, 2023

(54) SYSTEM AND METHOD FOR MONITORING PHASE-SEPARATION AND MUTUAL MISCIBILITY OF FLUID MIXTURES

(71) Applicant: Waters Technologies Corporation, Milford, MA (US)

(72) Inventors: Abhijit Tarafder, Blackstone, MA (US); Sebastien Besner, Bolton, MA (US); Mark Basile, Medford, MA (US); Martin Gilar, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 174 days.

(21) Appl. No.: 16/684,930

(22) Filed: Nov. 15, 2019

(65) Prior Publication Data
US 2020/0158605 A1     May 21, 2020

Related U.S. Application Data

(60) Provisional application No. 62/768,265, filed on Nov. 16, 2018.

(51) Int. Cl.
| | |
|---|---|
| *G01N 30/74* | (2006.01) |
| *G01N 21/33* | (2006.01) |
| *G01N 30/32* | (2006.01) |
| *G01N 30/34* | (2006.01) |

(52) U.S. Cl.
CPC .............. *G01N 30/74* (2013.01); *G01N 21/33* (2013.01); *G01N 30/32* (2013.01); *G01N 30/34* (2013.01); *G01N 2030/326* (2013.01); *G01N 2030/347* (2013.01)

(58) Field of Classification Search
CPC .......... G01N 1/38; G01N 21/01; G01N 21/33; G01N 30/30–388; G01N 2001/386; G01N 2030/326; G01N 2030/347; G01N 2201/023; B01F 15/00214; B01F 15/00357; B01F 15/00396
See application file for complete search history.

(56) References Cited

U.S. PATENT DOCUMENTS

| | | | | |
|---|---|---|---|---|
| 4,990,250 A | * | 2/1991 | Hellinger | G01N 30/32 210/101 |
| 6,923,916 B1 | * | 8/2005 | Hiraku | F04B 11/0083 210/101 |

(Continued)

OTHER PUBLICATIONS

Ziegler et al. "Estimation of Liquid-Vapor Critical Loci for CO2-Solvent Mixtures Using a Peak-Shape Method." Anal. Chem. 67(1995): 456-461.

*Primary Examiner* — Justin N Olamit
(74) *Attorney, Agent, or Firm* — Womble Bond Dickinson (US) LLP; Deborah M. Vernon (57) ABSTRACT

Exemplary embodiments are directed to methods and systems for controlling fluid parameters within a detector. A first and second fluid pump manager control the flow of a first and second fluid to one or more heating/cooling devices, and a mixer receives and mixes the first and second fluids. An optical detector flow cell receives the fluid mixture from the mixer, and a pressure regulator controls the pressure at the optical detector flow cell. Thus, the composition, temperature, and pressure of a fluid mixture entering an optical detector flow cell can be controlled in real time.

18 Claims, 10 Drawing Sheets

(56) References Cited

U.S. PATENT DOCUMENTS

| | | | | |
|---|---|---|---|---|
| 7,507,337 | B2* | 3/2009 | Petro | G01N 30/20 |
| | | | | 210/101 |
| 7,550,081 | B2* | 6/2009 | Kitagawa | G01N 30/32 |
| | | | | 210/101 |
| 8,293,111 | B2* | 10/2012 | Thurbide | A23F 5/206 |
| | | | | 210/635 |
| 9,086,156 | B2* | 7/2015 | Zachmann | F16K 7/16 |
| 9,518,960 | B2* | 12/2016 | Nema | G01N 30/88 |
| 9,694,301 | B2* | 7/2017 | Choikhet | B01D 15/18 |
| 9,764,251 | B2* | 9/2017 | Berg | G01N 30/20 |
| 9,772,287 | B2* | 9/2017 | Al-Moniee | G01N 33/1826 |
| 2011/0167898 | A1* | 7/2011 | Zhou | G01N 30/24 |
| | | | | 73/61.55 |
| 2012/0166098 | A1* | 6/2012 | McCreary | G01N 30/34 |
| | | | | 702/25 |
| 2018/0059005 | A1* | 3/2018 | Marshall | G01N 21/39 |
| 2020/0061494 | A1* | 2/2020 | Ieuji | B01D 15/10 |

* cited by examiner

SYSTEM AND METHOD FOR MONITORING PHASE-SEPARATION AND MUTUAL MISCIBILITY OF FLUID MIXTURES

CROSS-REFERENCE TO RELATED APPLICATIONS

This application claims priority to and benefit of U.S. provisional patent application No. 62/768,265 filed Nov. 16, 2018, the entire contents of which is incorporated herein by reference in its entirety.

TECHNICAL FIELD

The present disclosure relates to monitoring phase change conditions and the mutual miscibility of fluid mixtures. More specifically, the present disclosure relates to monitoring phase change conditions and mutual miscibility of fluids at varying temperature and pressure values.

BACKGROUND

During certain analytical and preparative processes, such as $CO_2$-based fluid chromatography and/or extraction, the mutual miscibility of fluid mixtures can be important. For example, during a chromatographic separation process, a mobile phase including immiscible solvents may lead to precipitation of sample compounds inside the column or the system, resulting in system shutdown. At the very least, solvent immiscibility may lead to unacceptable chromatographic separation inside the column. It is therefore desirable to know the mutual miscibility of various fluids and compounds, as well as the phase-separation conditions for different fluids and compounds.

SUMMARY

According to an embodiment of the present disclosure, fluid pump managers, preheaters, and a pressure regulator are used to dynamically control the composition, temperature, and pressure of various fluid mixtures entering a detector. A detector, such as an optical detector, measures the mutual miscibility and phase change conditions of the various fluid mixtures at different temperature and pressure values, which facilitates method development.

In one aspect, the present technology relates to a system for controlling fluid parameters within a detector. The system includes a first fluid pump manager configured to control a flow of a first fluid and a second fluid pump manager configured to control a flow of a second fluid. The system also includes a fluid heating/cooling device configured to receive the first fluid from the first fluid pump manager and receive the second fluid from the second fluid pump manager, and a mixer configured to receive the first fluid and the second fluid from the fluid heating/cooling device. The system also includes an optical detector flow cell configured to receive a fluid mixture from the mixer and a pressure regulator located downstream of the optical detector flow cell and configured to actively control a pressure at the optical detector flow cell. In one example embodiment, the first fluid pump manager and the second fluid pump manager are programmed to actively adjust a proportion of the first fluid and the second fluid directed to the mixer in real time. In another example embodiment, the first fluid pump manager includes at least two fluid pumps and is programmed to direct specified proportions of at least two fluids to the fluid heating/cooling device via a second mixer. In another example embodiment, the second fluid pump manager includes at least two fluid pumps and is programmed to direct specified proportions of at least two fluids to the fluid heating/cooling device via a third mixer. In another example embodiment, the first fluid pump manager or the second fluid pump manager is configured to direct compressed $CO_2$ to the fluid heating/cooling device. In another example embodiment, the fluid heating/cooling device includes a separate first and second fluid heating/cooling device located downstream of the first fluid pump manager and the second fluid pump manager, respectively, the system also includes a third fluid heating/cooling device located downstream of the mixer configured to control a temperature of the fluid mixture prior to entering the optical detector flow cell. In another example embodiment, the optical detector flow cell is a component of a UV-vis detector utilizing a wavelength selected to provide high scattering efficiency through immiscible fluids and negligible scattering or absorption of light through miscible fluids. In another example embodiment, the system also includes a controller configured to control the operation of the first pump manager, the second pump manager, the first and second fluid heating/cooling devices, and the pressure regulator in order to measure the miscibility of various fluid compositions in real time under different temperature and pressure conditions.

In another aspect, the present technology relates to a method for controlling fluid parameters within a detector. The method includes controlling a flow of a first fluid to a first preheater using a first fluid pump manager, controlling a flow of a second fluid to a second preheater using a second fluid pump manager, and heating the first fluid and the second fluid to a specified temperature using the first and second preheaters, respectively. The method also includes receiving the first fluid and the second fluid at a mixer located downstream of the first and second preheaters, directing a fluid mixture from the mixer to an optical detector flow cell, and actively controlling a pressure at the optical detector flow cell using a pressure regulator. In one example embodiment, controlling the flow of the first fluid and controlling the flow of the second fluid include actively adjusting a proportion of the first fluid and the second fluid directed to the mixer in real time. In another example embodiment, the first fluid pump manager includes at least two fluid pumps and is programmed to direct specified proportions of at least two fluids to the first preheater via a second mixer. In another example embodiment, the second fluid pump manager includes at least two fluid pumps and is programmed to direct specified proportions of at least two fluids to the second preheater via a third mixer. In another example embodiment, the first fluid pump manager or the second fluid pump manager is configured to direct compressed $CO_2$ to the first or second preheater. In another example embodiment, the method also includes controlling a temperature of the fluid mixture prior to entering the optical detector flow cell using a third preheater located downstream of the mixer. In another example embodiment, the optical detector flow cell is a component of a UV-vis detector utilizing a wavelength selected to provide high scattering efficiency through immiscible fluids and negligible scattering or absorption of light through miscible fluids. In another example embodiment, the method also includes controlling the operation of the first pump manager, the second pump manager, the first and second preheaters, and the pressure regulator in order to measure the miscibility of various fluid compositions in real time under different temperature and pressure conditions.

In another aspect, the present technology relates to a system for monitoring miscibility and phase separation of fluid mixtures comprising. The system includes a first fluid pump manager configured to control a flow of a first fluid, a second fluid pump manager configured to control a flow of a second fluid, and a first preheater configured to receive the first fluid from the first fluid pump manager and heat the first fluid to a predetermined temperature. The system also includes a second preheater configured to receive the second fluid from the second fluid pump manager and heat the second fluid to a predetermined temperature, and a mixer configured to receive the first fluid and the second fluid from the preheater and create a fluid mixture. The system also includes an optical detector flow cell configured to receive the fluid mixture from the mixer, a pressure regulator located downstream of the optical detector flow cell and configured to actively control a pressure at the optical detector flow cell, and a controller configured to control operation of the first fluid pump manager, the second fluid pump manager, the first preheater, the second preheater, and the pressure regulator in order to control a temperature, pressure, and composition of the fluid mixture within the optical detector flow cell.

The above aspects of the technology provide numerous advantages. For example, the techniques described herein allow for real time analysis and calculation of the mutual miscibility and phase change conditions for many different fluid compositions at different temperature and pressure values. The techniques described herein allow for higher throughput of different fluid mixtures without needing to disconnect and reconnect various fluid or solvent sources. The ability to adjust the temperature and pressure values dynamically also increases efficiency by not requiring the system to be taken offline when changes in temperature and pressure are required.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DESCRIPTION OF EXEMPLARY EMBODIMENTS

In general, the present technology is related to systems and methods for monitoring phase-separation and mutual miscibility of multi-component fluid mixtures. According to one embodiment, the system disclosed herein can detect phase-separation conditions by monitoring changes in UV absorbance in real time as the components of a multi-component fluid are adjusted.

During a chromatographic separation process, a sample is injected to the chromatographic column and is then continuously washed with a solvent flow (mobile phase). The basic criteria for selecting a mobile phase solvent is that the compounds in the sample are soluble in the solvent, and if the mobile phase is prepared by mixing more than one solvent, the solvents are miscible to each other. A mobile phase including immiscible solvents may lead to precipitation of sample compounds inside the column or the system, resulting in system shutdown. At the very least, solvent immiscibility may lead to unacceptable chromatographic separation inside the column. It is therefore desirable to know the mutual miscibility of various fluids and compounds, as well as the phase-separation conditions for different fluids and compounds.

According to an embodiment of the present disclosure, fluid pump managers, preheaters, and a pressure regulator can be used to dynamically control the composition, temperature, and pressure of various fluid mixtures entering a detector. In a non-limiting example, the detector can be a UV optical detector. One skilled in the art will appreciate that other types of detectors can be used, such as thermal conductivity detectors or refractive index detectors. Solvent immiscibility can be also detected by densitometers and ultra-sonic devices. In some example embodiments, the systems disclosed herein can be used to measure and generate phase-diagrams of different solvent compositions. For simplicity, the detectors in the examples presented below are generally referred to as optical detectors. The methods and systems described herein may be useful during method development in $CO_2$-based fluid chromatography and/or extraction, or in any other situations where mutual miscibility of at least two fluids is investigated. The system disclosed herein can be placed online, in some embodiments, which results in continuous monitoring.

Figure 1:
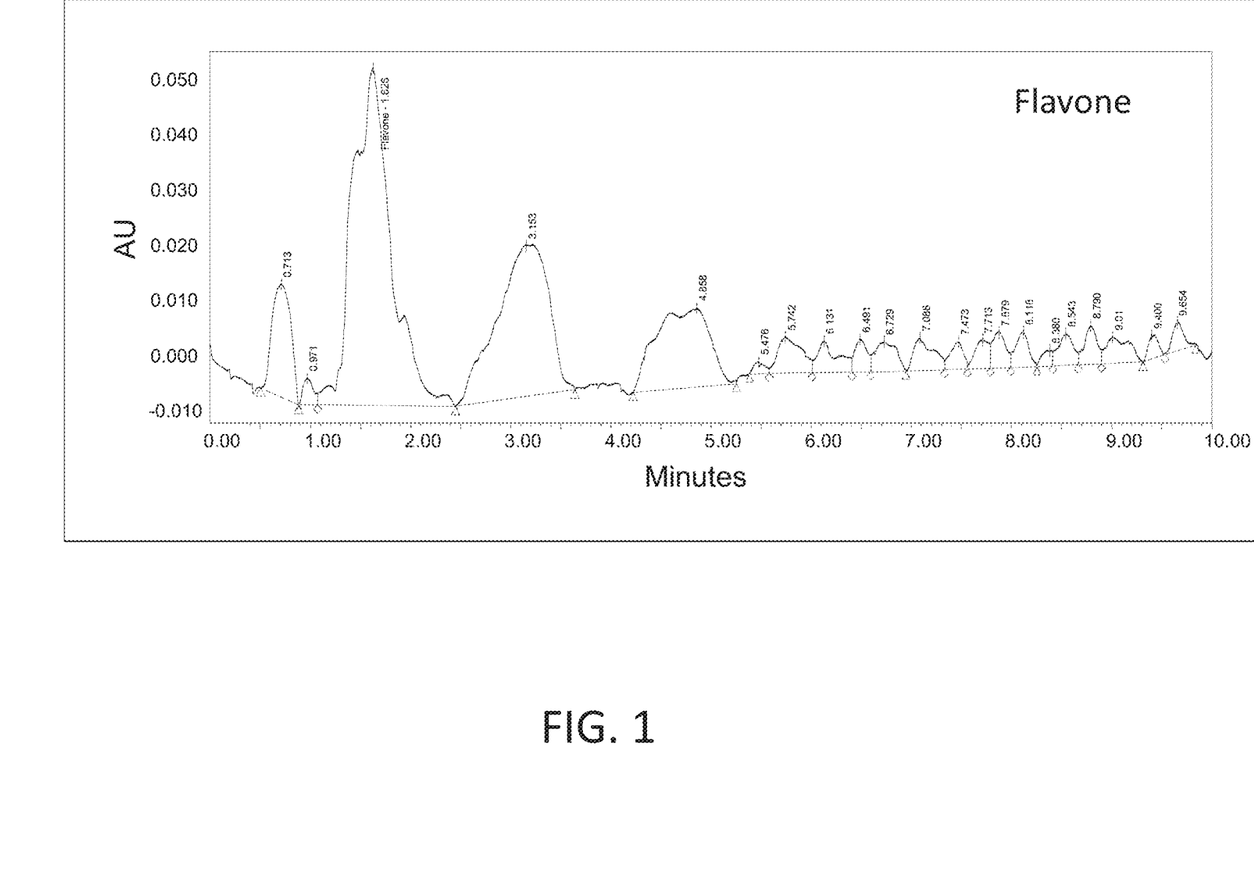
FIG. 1 illustrates an unacceptable chromatographic separation inside a column due to solvent immiscibility.

FIG. 1 illustrates an unacceptable chromatographic separation inside a column due to solvent immiscibility. In this example, the analyte injected was flavone, and a UV signal is detected under a condition where the solvents were immiscible. There was no single peak detection of flavone—rather a stream of peaks came out. The solvents used in this example were 30% MeOH in CO2, 1550 psi, 85 C (Isocratic).

In addition to leading to disruptions in chromatographic separation, solvent immiscibility can also lead to disruption of the detection process. For example inside a UV flow cell (see FIG. 2C) immiscible solvents result in fluid flow with chaotic changes in the local refractive indices and to the formation of liquid-liquid droplets of various sizes. This in turn leads to significant beam attenuation resulting from scattering and beam steering inside the optical flow cell.

According to one example embodiment, the system continuously pumps solvents with different compositions and monitors a detector signal in real time. If the solvents are perfectly miscible, the detector registers a stable signal with small baseline drift due to the change in the mixture bulk refractive index. If the solvents are immiscible, the detector registers signals that are continuously and randomly varying due to the stochastic changes in the flow cell optical transmission. Such random variation of detector signal can be registered as very high absorbance baseline noise which magnitude and oscillation frequency is related to the degree of immiscibility of the solvents. In some example embodiments, the system can use and record a broad range of wavelengths simultaneously. In other embodiments, a particular wavelength can be used and may be preferable.

Figure 2A:
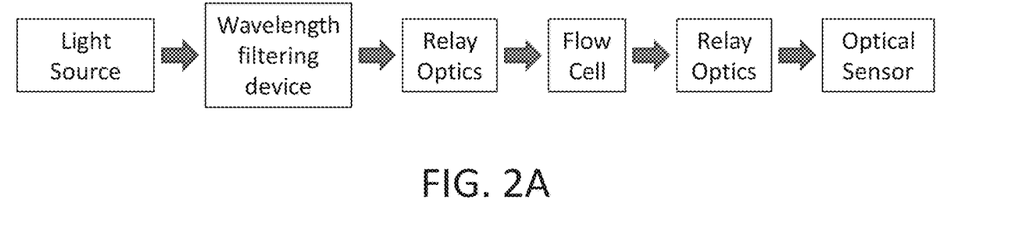
FIGS. 2A-2C illustrate example optics detector assemblies, according to embodiments of the present disclosure.
Figure 2B:
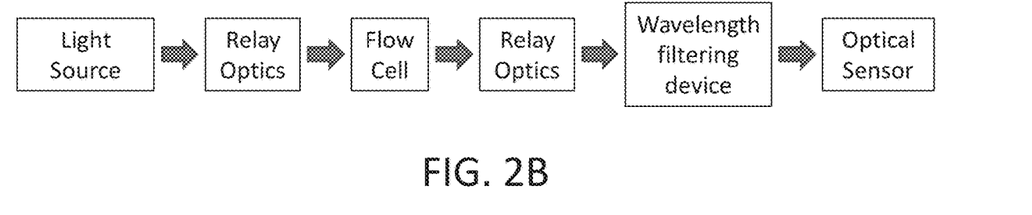
Figure 2C:
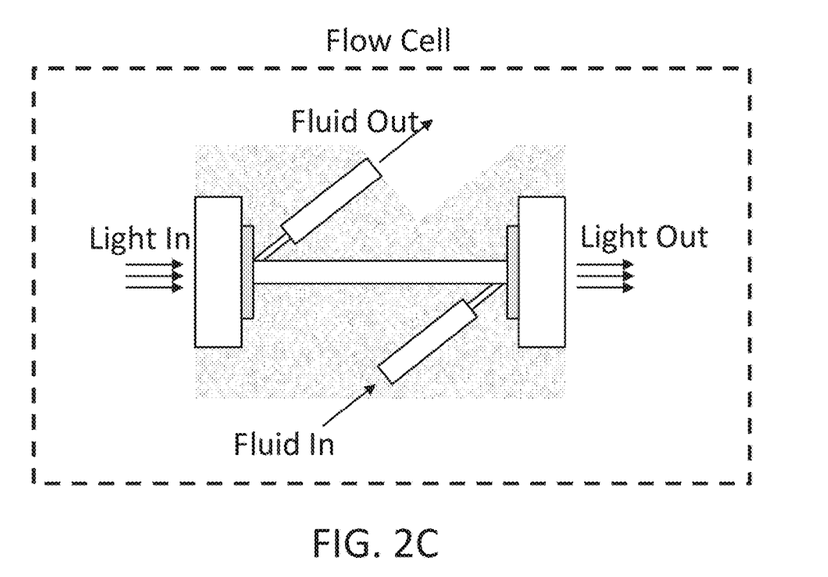

FIGS. 2A-2C illustrate example optics detector assemblies, according to embodiments of the present disclosure. The assemblies shown in FIGS. 2A-2B may include, but are not limited to, a light source, a wavelength filtering device, relay optics, an optical sensor, and a flow cell. FIG. 2A shows an example embodiment wherein the wavelength filtering device is positioned between the light source and the first relay optics, as typically used in single wavelength or scannable-wavelength detectors. FIG. 2B shows an example embodiment wherein the wavelength filtering device is positioned between the second relay optics and the optical detector, as typically encountered in diode array detectors. The light source can include, for example, a narrow band light source (laser, laser diode, LED) or a broad band light source (deuterium lamp, xenon lamp, halogen, etc.). The wavelength filtering device can be optional, in some embodiments, and can include optical filters or dispersing optics such as gratings or prisms. In some embodiments, the relay optics can include optical fibers or free space optics (windows, lenses, mirrors). The optical sensor can include, for example, a single element detector (photodiode, PMT, etc.) or a linear sensor array (CCD, CMOS). The example detector flow cell shown in FIG. 2C includes a light input, a fluid input, a light output, and a fluid output. The optical input and output faces can either be sealed by an optically transparent window or directly sealed by the surfaces of an optical fiber coupler. The fluid can be directly coupled within the optical volume, as shown in the embodiment of FIG. 2C, or coupled outside the optical volume by proper gasket arrangement at the input and output faces. The difference in the light transmitted by the central fluidic bore is what provides information on solvent miscibility. This bore can be directly machined into a solid cell (PEEK, stainless steel, titanium, etc.) or be constituted of a light guiding material such as Teflon AF or properly coated glass capillary.

Figure 3:
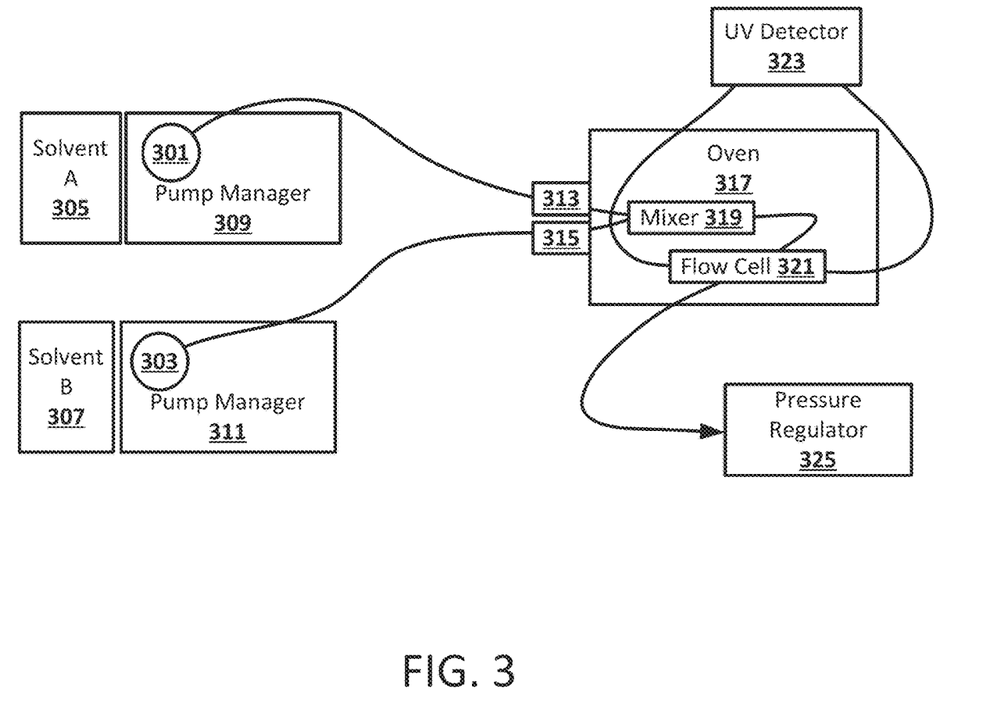
FIG. 3 is a block diagram showing an example phase separation measuring system, according to an embodiment of the present disclosure.

FIG. 3 is a block diagram showing an example phase separation measuring system, according to an embodiment of the present disclosure. In this example embodiment, two separate pumps 301, 303 deliver different solvents. The first pump 301 delivers solvent A 305, while the second pump 303 delivers solvent B 307. A first pump manager 309 can control the flow rate of solvent A 305, while a second pump manager 311 can control the flow rate of solvent B, in some embodiments. The solvents can then pass through two active preheaters 313, 315, respectively, before being mixed in a mixer 319 and being directed to a flow cell 321. The preheaters 313, 315 can be configured to heat or cool the solvents at or near the temperature of the oven 317. The flow cell 321 can be illuminated by light originating from a UV detector 323 and being passed through an optical fiber, in some embodiments.

After passing through the flow-cell 321, the light is captured and carried back to the UV detector 323 by an optical fiber placed at the other end of the flow-cell 321. The fluidic outlet of the flow cell 321 leads to a pressure-regulating device 325 before being discarded to waste, or collected as fractions. The mixer 319 and flow-cell 321 are kept inside the oven 317, in some embodiments, where they can be maintained at a pre-set temperature. Pressure inside the cell 321 can be maintained by controlling the pressure-regulator 325. With these capabilities, this system can control all the basic parameters—(a) solvent components, (b) solvent compositions, (c) mixture temperature and (d) mixture pressure, that control solvent miscibility. Using this system, one can determine the state conditions where a solvent mixture is either miscible or immiscible to each other employing an automatable environment. In a non-limiting example, a third fluid heating/cooling element or heat exchanger can be positioned downstream of the mixer 319 in order to ensure that the fluid entering the flow cell 321 is at the correct temperature. Significant fluctuations in temperature may happen, in some cases, during the mixing of the solvents, so it may be beneficial to include a heat exchanger just after the mixer 319 to ensure that the mixed fluid reached the required temperature.

Figure 4:
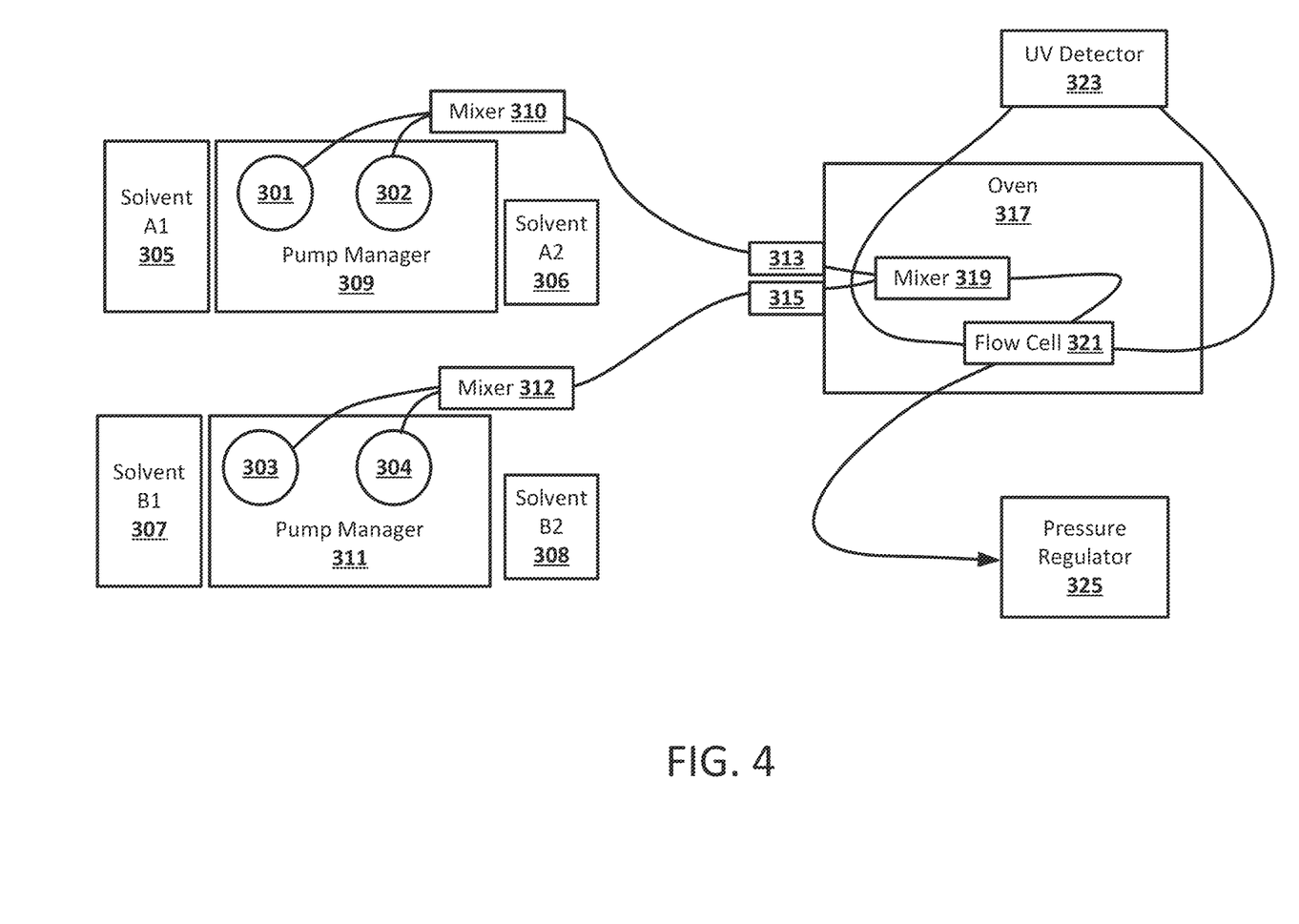
FIG. 4 is a block diagram showing another example phase separation measuring system, according to an embodiment of the present disclosure.

FIG. 4 is a block diagram showing another example phase separation measuring system, according to an embodiment of the present disclosure. In this example embodiment, four separate pumps 301, 302, 303, 304 deliver different solvents. The first pump 301 delivers solvent A1 305, the second pump 303 delivers solvent B1 307, the third pump 302 delivers solvent A2 306, and the fourth pump 304 delivers solvent B2 308. A first pump manager 309 can control the flow rate of solvent A1 305 and solvent A2 306, while a second pump manager 311 can control the flow rate of solvent B1 and solvent B2, in some embodiments. In this example embodiment, solvent A1 305 and solvent A2 306 are directed from the first pump manager 309 to a first mixer 310, and solvent B1 307 and solvent B2 308 are directed from the second pump manager 311 to a second mixer 312. The solvents can then pass from the first and second mixers 310, 312 through two active preheaters 313, 315, respectively, before being mixed in a mixer 319 and being directed to a flow cell 321. The preheaters 313, 315 can be configured to heat or cool the solvents at or near the temperature of the oven 317. The flow cell 321 can be illuminated by light originating from a UV detector 323 and being passed through an optical fiber, in some embodiments.

After passing through the flow-cell 321, the light is captured and carried back to the UV detector 323 by an optical fiber placed at the other end of the flow-cell 321. The fluidic outlet of the flow cell 321 leads to a pressure-regulating device 325 before being discarded to waste, or collected as fractions. The mixer 319 and flow-cell 321 are kept inside the oven 317, in some embodiments, where they can be maintained at a pre-set temperature. Pressure inside the cell 321 can be maintained by controlling the pressure-regulator 325. With these capabilities, this system can control all the basic parameters—(a) solvent components, (b) solvent compositions, (c) mixture temperature and (d) mixture pressure, that control solvent miscibility. Using this system, one can determine the state conditions where a solvent mixture is either miscible or immiscible to each other employing an automatable environment. This example system can adjust a greater variety of solvent components and compositions using the four pumps 301, 302, 303, 304 and the first and second pump managers 309, 311. In one example embodiment, solvents A1 and A2, and solvents B1 and B2 are perfectly miscible with each other, respectively, but the mixture of A (result of A1 and A2) and B (result of B1 and B2) solvents, however, can be miscible only under certain mixing ratios, temperature and pressure. In a non-limiting example, a third fluid heating/cooling element or heat exchanger can be positioned downstream of the mixer 319 in order to ensure that the fluid entering the flow cell 321 is at the correct temperature. Significant fluctuations in temperature may happen, in some cases, during the mixing of the solvents, so it may be beneficial to include a heat exchanger just after the mixer 319 to ensure that the mixed fluid reached the required temperature.

Figure 5:
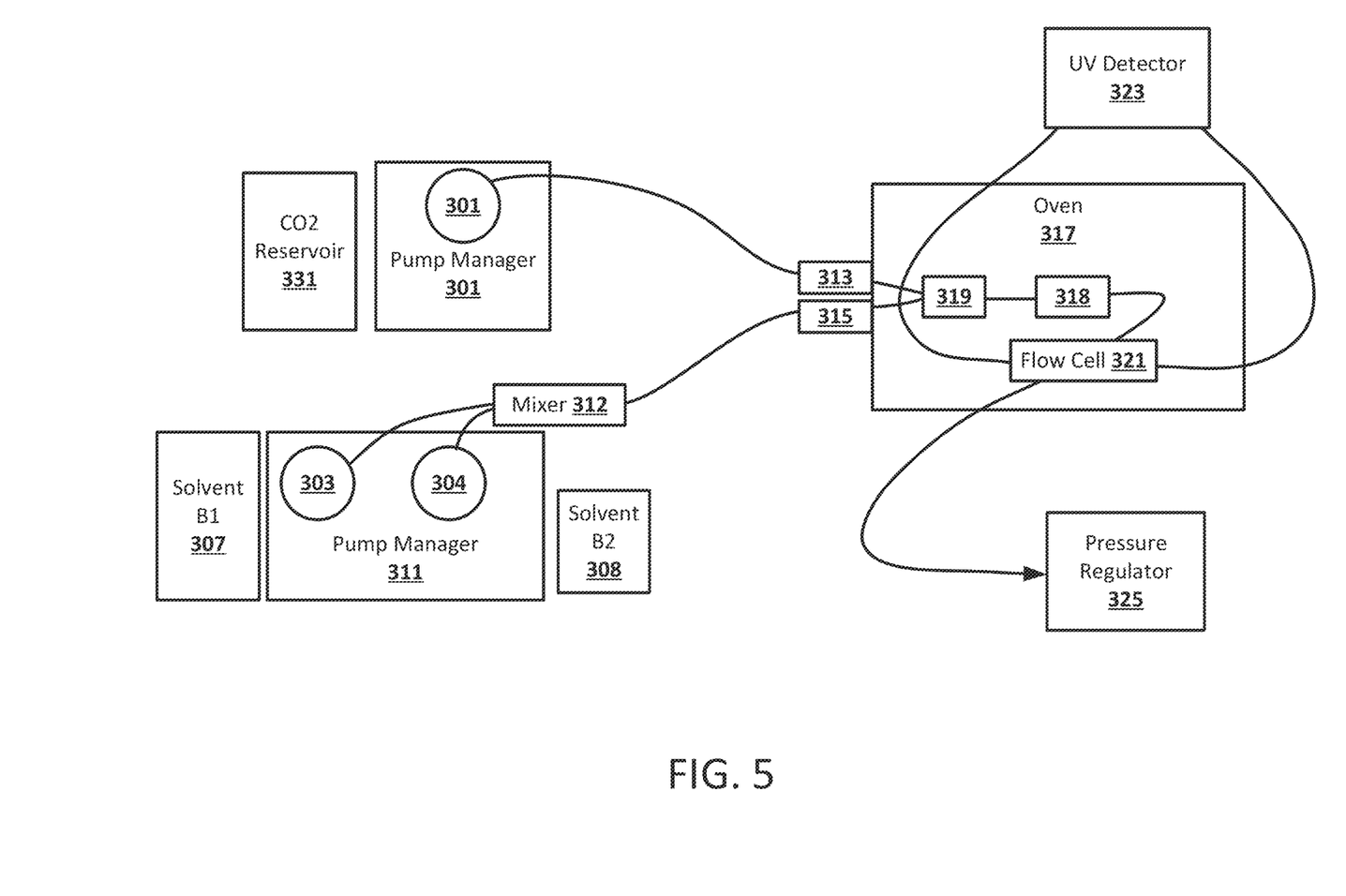
FIG. 5 is a block diagram showing another example phase separation measuring system, according to an embodiment of the present disclosure.

FIG. 5 is a block diagram showing another example phase separation measuring system, according to an embodiment of the present disclosure. In this example embodiment, three separate pumps 301, 303, 304 deliver different solvents. The first pump 301 delivers $CO_2$ 331, in this example embodiment. A first pump manager 309 can control the flow rate of $CO_2$ 331, while a second pump manager 311 can control the flow rate of solvent B1 307 and solvent B2 308. In this example embodiment, solvent B1 307 and solvent B2 308 are directed from the second pump manager 311 to a second mixer 312. The solvents can then pass through two active preheaters 313, 315, respectively, before being mixed in an oven mixer 319. In this example embodiment, a third fluid heating/cooling element 318 is positioned downstream of the mixer 319 in order to ensure that the fluid entering the flow cell 321 is at the correct temperature. In some embodiments, the fluid may change temperatures while being mixed in the oven mixer 319, and an additional heating/cooling element 318 can ensure that the fluid mixture entering the flow cell 321 is at the desired temperature. The preheaters 313, 315 can be configured to heat the solvents at or near the temperature of the oven 317. The flow cell 321 can be illuminated by light originating from a UV detector 323 and being passed through an optical fiber, in some embodiments. An automated back pressure regulator 325 can be positioned downstream of the flow cell 321 in order to maintain a desired pressure at the flow cell 321.

Figure 6:
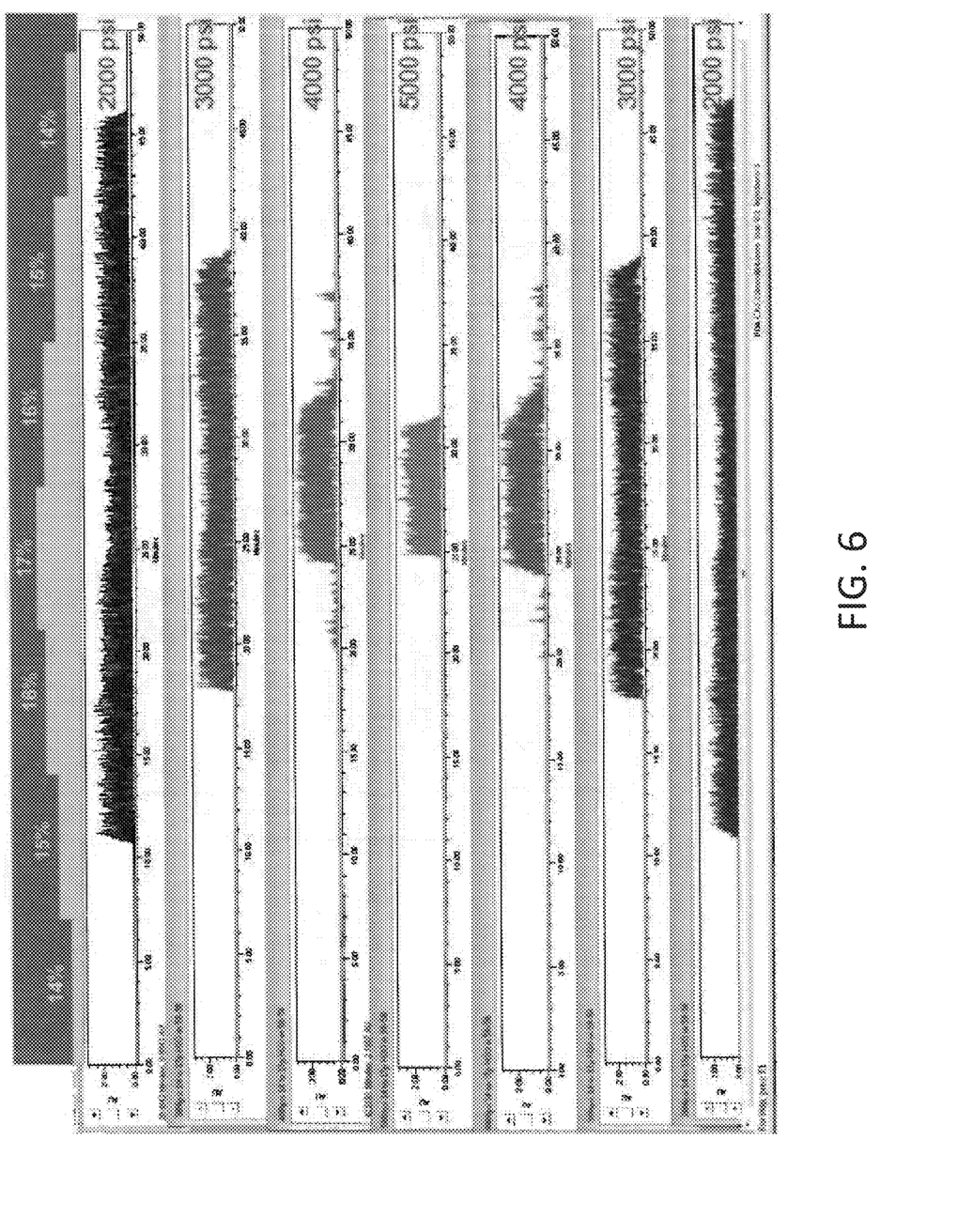
FIG. 6 shows graphs of UV signals and signal noise at different compositions of $CO_2$ and methanol and water mixture, according to an embodiment of the present disclosure.

FIG. 6 shows graphs of UV signals and signal noise at different compositions of $CO_2$ and methanol and water mixture, according to an embodiment of the present disclosure. In this example embodiment, a stream of $CO_2$ at 0.6 mL/min (stream A) was mixed with a stream of water/methanol mixture at 0.6 mL/min (stream B). The starting composition of stream B (v/v), of water in the methanol/water mixture, was 14%. The water composition was then increased respectively to 15, 16 and 17% at intervals of 7 min. 17% of water, in methanol/water mixture, was continued for 7 min, after which the composition was brought back to 16, 15, and 14%, respectively, again at 7 min interval. The method was carried out at pressures 2000, 3000, 4000 and 5000 psi, at 30 C. In this example, the detection was performed at 254 nm wavelength.

Results presented in FIG. 6 show how increasing pressure increases solvent miscibility. At 2000 psi, when there is 14% water in solvent stream B (methanol/water mixture), the detector response (in AU) remained almost constant as a function of time. When the water composition was changed to 15% in stream B, after the 4 min delay time, detector response became significantly noisy. This is caused by rapid variation of energy count captured by the detector. The reason behind such rapid variation is the passage of immiscible phases, which leads to random beam steering inside the optical flowcell.

Figure 7A:
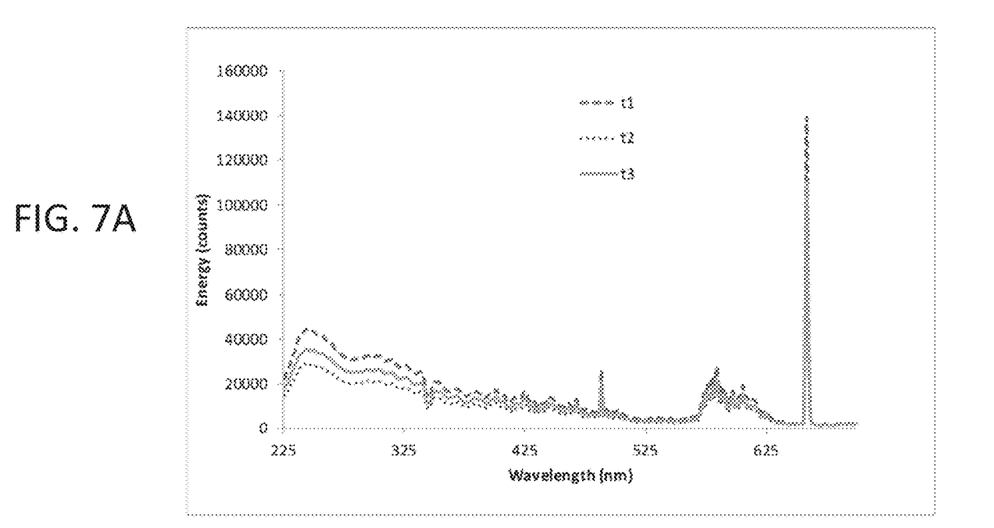
FIGS. 7A-7B are graphs showing UV signals against different compositions of $CO_2$ and a methanol/water mixture, according to an embodiment of the present disclosure.
Figure 7B:
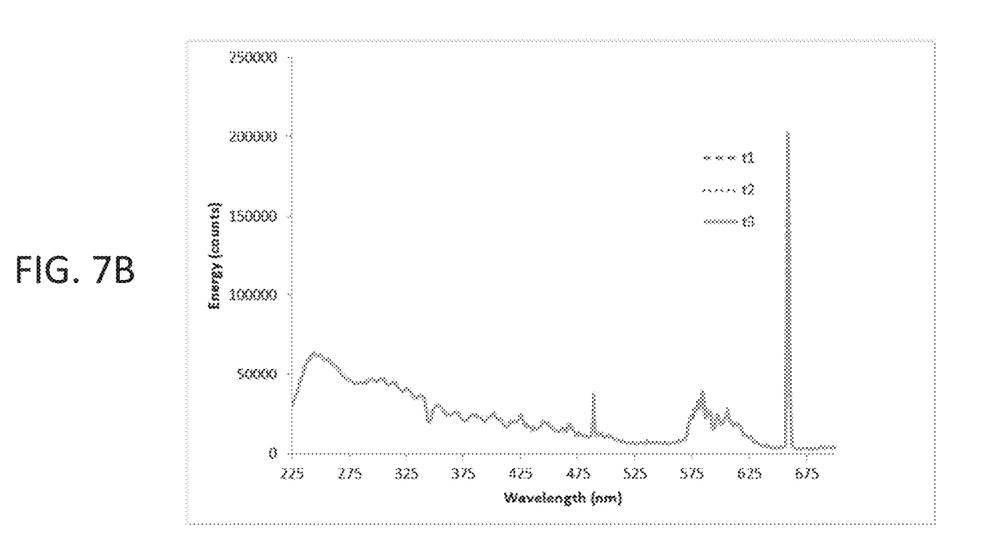

FIGS. 7A-7B are graphs showing UV signals against different compositions of $CO_2$ and a methanol/water mixture, according to an embodiment of the present disclosure. Here the mobile phase composition was 40/60 (v/v,%) of $CO_2$ and the methanol/water mixture, respectively. In the methanol/water mixture, water composition (v/v,%) was 20. Experiments were carried out at 30° C. at different pressures. Note that at 30° C., all conditions led to immiscibility of solvents, which is why at all conditions significant UV noise was recorded.

FIG. 7A demonstrates the variation of energy count at three different times at an interval of 2s when an immiscible phase is passing through the flow cell. FIG. 7B demonstrates the variation of energy count at the same time interval when a miscible phase is passing through the flow cell. Rapid variation in the energy count gives rise to the significant baseline noise which is demonstrated in FIG. 6 above.

Figure 8:
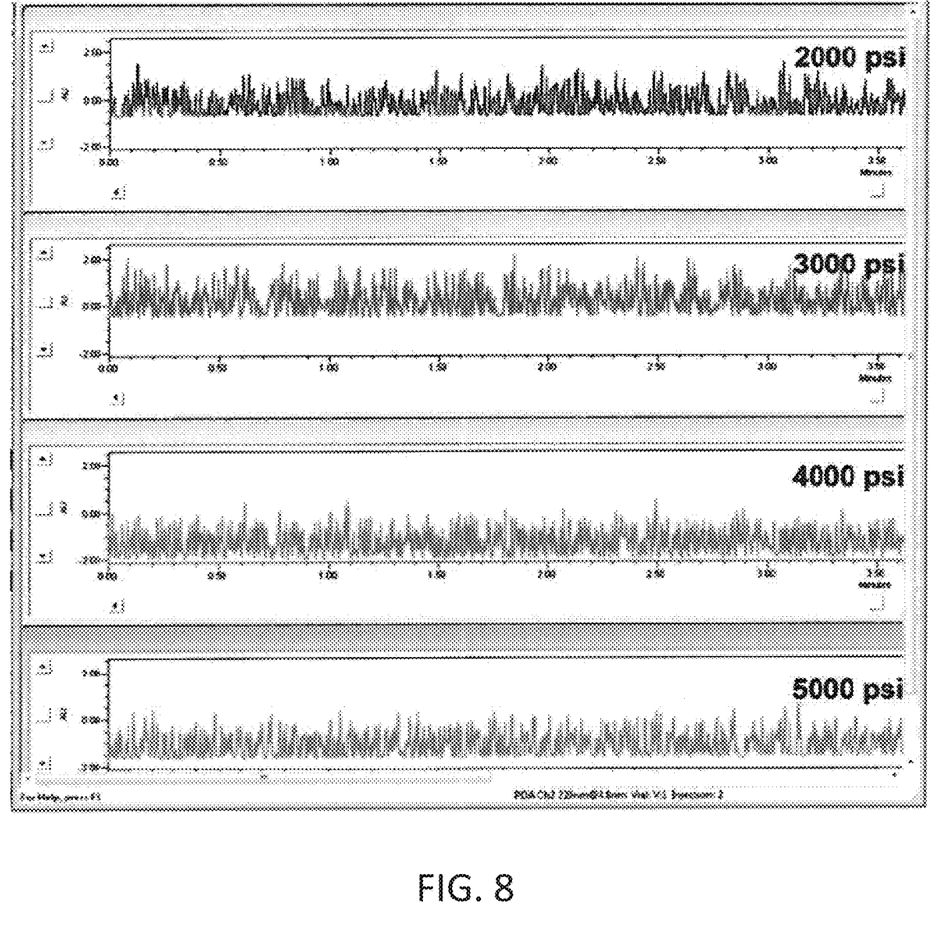
FIG. 8 shows a graph of UV signals when a mobile phase composition of $CO_2$ and a methanol/water mixture is passed through an optical flow cell at different pressures at 30° C., according to an embodiment of the present disclosure.

FIG. 8 shows a graph of UV signals (254 nm) when a mobile phase composition of 40/60 (v/v,%) of $CO_2$ and a methanol/water mixture, respectively, is passed through an optical flow cell at different pressures at 30° C., according to an embodiment of the present disclosure. In the methanol/water solvent stream, water composition (v/v,%) is 20. Note that under all conditions shown here the mobile phase is immiscible, which is why at all conditions significant swing in the absorbance was recorded.

Figure 9:
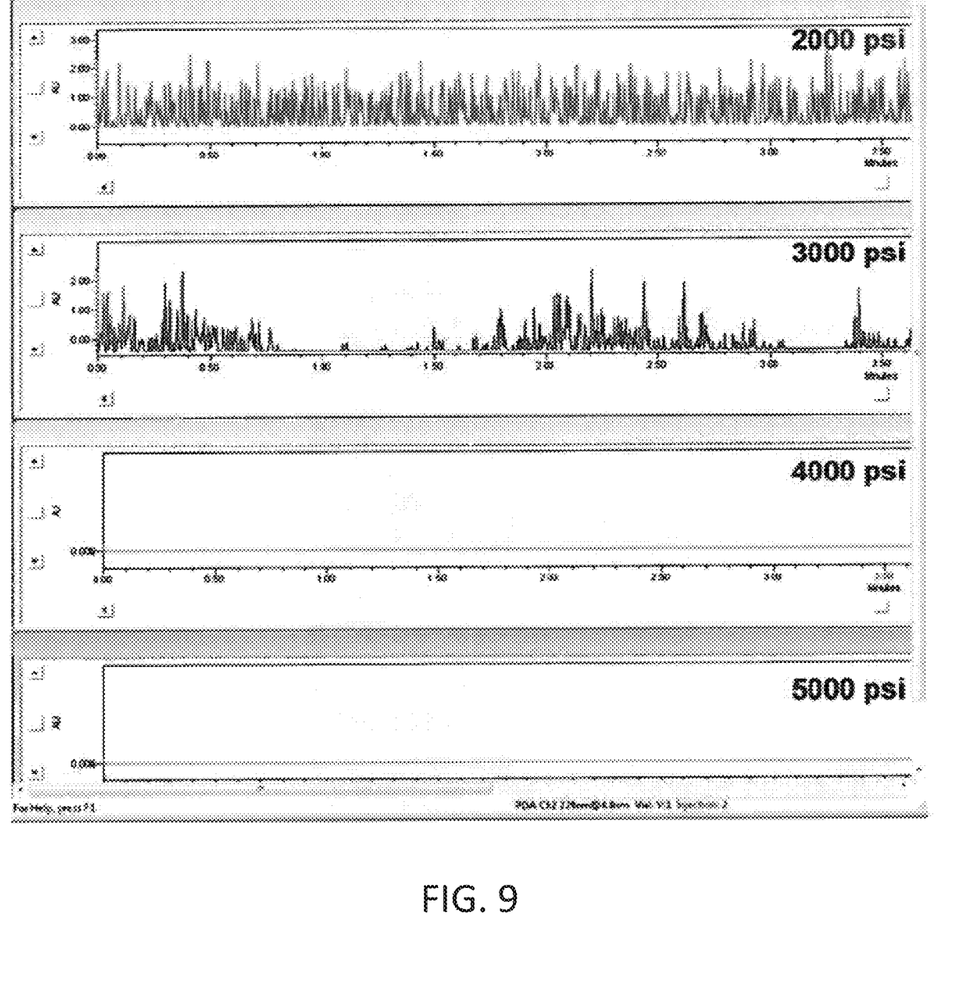
FIG. 9 shows a graph of UV signals when a mobile phase of composition of $CO_2$ and a methanol/water mixture is passed through an optical flow cell at different pressures at 50° C., according to an embodiment of the present disclosure.

FIG. 9 shows a graph of UV signals (254 nm) when a mobile phase of composition 40/60 (v/v,%) of $CO_2$ and a methanol/water mixture, respectively, is passed through an optical flow cell at different pressures at 50° C., according to an embodiment of the present disclosure. In B, water composition (v/v) is 20%. Note that at 2000 and 3000 psi, solvents were immiscible, which caused the swing in the absorbance. At 4000 and 5000 psi, on the other hand, solvents were miscible; hence UV signal was steady and devoid of chaotic variation.

FIGS. 8 and 9 show the effects of pressure and temperature on the miscibility of a mixture where $CO_2$ is mixed with a methanol/water mixture at a ratio of 40/60 (v/v,%), respectively. In these example experiments, at 30° C. this mixture is immiscible at all the pressures tried (2000, 3000, 4000, and 5000 psi), which led to very noisy baseline as witnessed in FIG. 6. The mixture remains immiscible at 2000 and 3000 psi when the temperature is increased to 50° C., as demonstrated by the noisy baseline. But the mixture was miscible at pressures of 4000 and 5000 psi.

Figure 10:
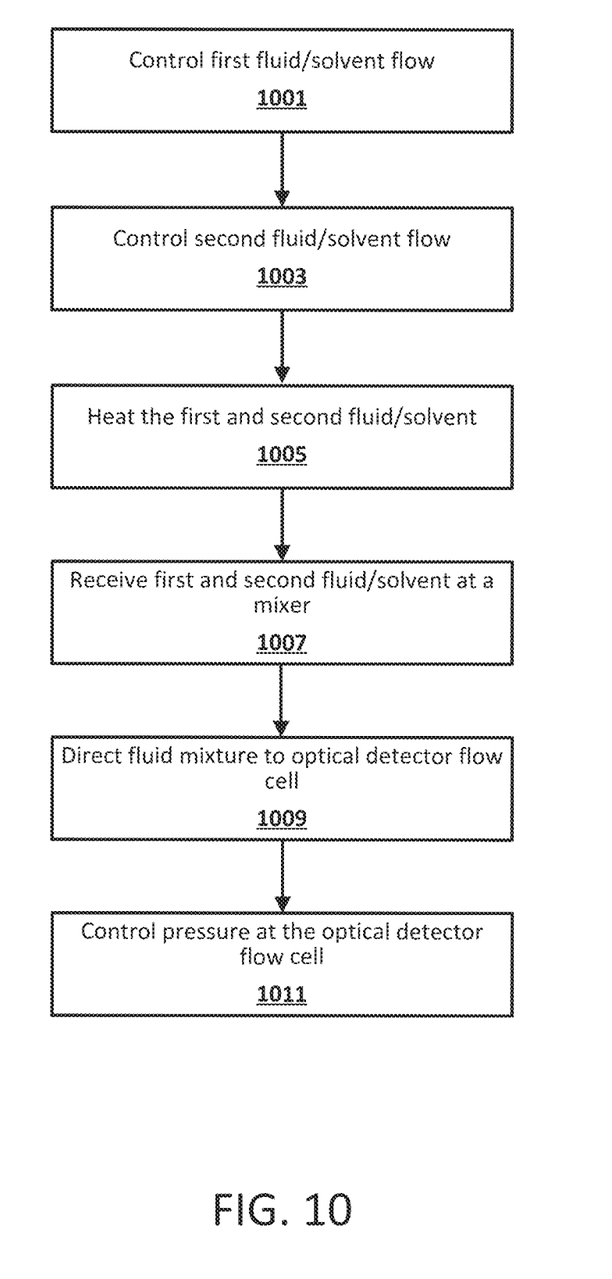
FIG. 10 is an example flowchart of a method for controlling fluid parameters within a detector, in accordance with an embodiment of the present disclosure

FIG. 10 is an example flowchart of a method for controlling fluid parameters within a detector, in accordance with an embodiment of the present disclosure. In step 1001, the flow of a first fluid or solvent is controlled using a first fluid pump manager. In some embodiments, the first fluid pump manager can control the flow rate of the first fluid. In a non-limiting example, the first fluid pump manager can include two distinct fluid pumps configured to pump two fluids to a first mixer, and the first fluid pump manager can be programmed to direct specified proportions of the two fluids to the first mixer. In another non-limiting example, the first fluid pump manager can be configured to control the flow of compressed $CO_2$, or a solvent containing compressed $CO_2$, to a first preheater.

In step 1003, the flow of a second fluid or solvent is controlled using a second fluid pump manager. In some embodiments, the second fluid pump manager can control the flow rate of the second fluid. In a non-limiting example, the second fluid pump manager can include two distinct fluid pumps configured to pump two fluids to a mixer, and the fluid pump manager can be programmed to direct specified proportions of the two fluids to the mixer. In another non-limiting example, the second fluid pump manager can be configured to control the flow of compressed $CO_2$, or a solvent containing compressed $CO_2$, to a second preheater.

In step 1005, the first fluid and the second fluid are heated to a specified temperature using first and second preheaters, respectively. In a non-limiting example, the preheaters can heat the first and second fluid to a desired temperature, and can adjust the temperature of the fluid before being directed to a mixer. In another non-limiting example, a third preheater can be positioned downstream of the mixer in order to ensure that the fluid entering the detector flow cell is at the desired temperature after exiting the mixer.

In step 1007, a mixer located downstream of the first and second preheaters and configured to receive the first fluid and the second fluid. The mixer can mix the first and second fluids prior to being directed to the detector flow cell. In a non-limiting example, a controller is configured to control the proportions of the first and second fluids entering the mixer in real time, thus adjusting the composition of the fluid entering the detector flow cell.

In step 1009, the fluid mixture exiting the mixer is directed to an optical detector flow cell. In a non-limiting example, the optical detector flow cell is a component of a UV detector. In some embodiments, the UV detector utilizes a wavelength selected to provide high scattering efficiency through immiscible fluids and substantially no scattering or refraction of light through miscible fluids.

In step 1011, the pressure at the optical detector flow cell is actively controlled using a pressure regulator. In a non-limiting example, the pressure regulator is an active back pressure regulator. In another non-limiting example, a controller is configured to control the operation of the pressure regulator, as well as the first and second pump managers and the first and second preheaters, in order to measure the miscibility of various fluid compositions in real time under different temperature and pressure conditions using the detector.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for controlling fluid parameters within a detector comprising:
    a first fluid pump manager configured to control a flow of a first fluid;
    a second fluid pump manager configured to control a flow of a second fluid;
    a fluid heating/cooling device configured to receive the first fluid from the first fluid pump manager and receive the second fluid from the second fluid pump manager;
    a mixer configured to receive the first fluid and the second fluid from the fluid heating/cooling device;
    an optical detector flow cell configured to receive a fluid mixture directly from the mixer, wherein the optical detector flow cell is connected with the mixer through a conduit without any intervening structures comprising a chromatographic separation column between the mixer and the optical detector flow cell; and
    a pressure regulator located downstream of the optical detector flow cell and configured to actively control a pressure at the optical detector flow cell, wherein the first fluid pump manager and the second fluid pump manager are programmed to actively adjust a proportion of the first fluid and the second fluid directed to the mixer in real time.

2. The system of claim 1, wherein the first fluid pump manager includes at least two fluid pumps and is programmed to direct specified proportions of at least two fluids to the fluid heating/cooling device via a second mixer.

3. The system of claim 1, wherein the second fluid pump manager includes at least two fluid pumps and is programmed to direct specified proportions of at least two fluids to the fluid heating/cooling device via a third mixer.

4. The system of claim 1, wherein the first fluid pump manager or the second fluid pump manager is configured to direct compressed $CO_2$ to the fluid heating/cooling device.

5. The system of claim 1, wherein the fluid heating/cooling device includes a separate first and second fluid heating/cooling device located downstream of the first fluid pump manager and the second fluid pump manager, respectively, the system further comprising:
    a third fluid heating/cooling device located downstream of the mixer configured to control a temperature of the fluid mixture prior to entering the optical detector flow cell.

6. The system of claim 5, wherein the third fluid heating/cooling device comprises a heat exchanger.

7. The system of claim 1, wherein the optical detector flow cell is a component of a UV-vis detector utilizing a wavelength selected based on a scattering efficiency through immiscible fluids and a scattering or absorption of light through miscible fluids.

8. The system of claim 1, further comprising:
    a controller configured to control the operation of the first pump manager, the second pump manager, the first and second fluid heating/cooling devices, and the pressure regulator in order to measure the miscibility of various fluid compositions in real time under different temperature and pressure conditions.

9. The system of claim 1, wherein the fluid heating/cooling device comprises a heat exchanger.

10. The system of claim 1, wherein the fluid heating/cooling device comprises an oven or a preheater.

11. A method for controlling fluid parameters within a detector comprising:
    controlling a flow of a first fluid to a first preheater using a first fluid pump manager;

controlling a flow of a second fluid to a second preheater using a second fluid pump manager;

heating the first fluid and the second fluid to a specified temperature using the first and second preheaters, respectively;

receiving the first fluid and the second fluid at a mixer located downstream of the first and second preheaters;

directing a fluid mixture from the mixer directly to an optical detector flow cell, wherein the optical detector flow cell is connected with the mixer through a conduit without any intervening structures comprising a chromatographic separation column between the mixer and the optical detector flow cell; and actively controlling a pressure at the optical detector flow cell using a pressure regulator wherein controlling the flow of the first fluid and controlling the flow of the second fluid include actively adjusting a proportion of the first fluid and the second fluid directed to the mixer in real time.

12. The method of claim 11, wherein the first fluid pump manager includes at least two fluid pumps and is programmed to direct specified proportions of at least two fluids to the first preheater via a second mixer.

13. The method of claim 11, wherein the second fluid pump manager includes at least two fluid pumps and is programmed to direct specified proportions of at least two fluids to the second preheater via a third mixer.

14. The method of claim 11, wherein the first fluid pump manager or the second fluid pump manager is configured to direct compressed $CO_2$ to the first or second preheater.

15. The method of claim 11, further comprising:
controlling a temperature of the fluid mixture prior to entering the optical detector flow cell using a third preheater located downstream of the mixer and upstream of the optical detector flow cell.

16. The method of claim 11, wherein the optical detector flow cell is a component of a UV-vis detector utilizing a wavelength selected based on a scattering efficiency through immiscible fluids and a scattering or absorption of light through miscible fluids.

17. The method of claim 11, further comprising:
controlling the operation of the first pump manager, the second pump manager, the first and second preheaters, and the pressure regulator; and measuring the miscibility of various fluid compositions in real time under different temperature and pressure conditions.

18. A system for monitoring miscibility and phase separation of fluid mixtures comprising:

a first fluid pump manager configured to control a flow of a first fluid;

a second fluid pump manager configured to control a flow of a second fluid;

a first preheater configured to receive the first fluid from the first fluid pump manager and heat the first fluid to a predetermined temperature;

a second preheater configured to receive the second fluid from the second fluid pump manager and heat the second fluid to a predetermined temperature;

a mixer configured to receive the first fluid and the second fluid from the preheater and create a fluid mixture;

an optical detector flow cell configured to receive the fluid mixture directly from the mixer, wherein the optical detector flow cell is connected with the mixer through a conduit without any intervening structures comprising a chromatographic separation column between the mixer and the optical detector flow cell;

a pressure regulator located downstream of the optical detector flow cell and configured to actively control a pressure at the optical detector flow cell; and a controller configured to control operation of the first fluid pump manager, the second fluid pump manager, the first preheater, the second preheater, and the pressure regulator in order to control a temperature, pressure, and composition of the fluid mixture within the optical detector flow cell, wherein the first fluid pump manager and the second fluid pump manager are programmed to actively adjust a proportion of the first fluid and the second fluid directed to the mixer in real time.

* * * * *